Dec. 14, 1937.  R. C. SCHOCK  2,102,385
BREWING DEVICE
Filed April 20, 1936  3 Sheets—Sheet 2

Inventor
R. C. Schock
By C. P. Goepel
Attorney

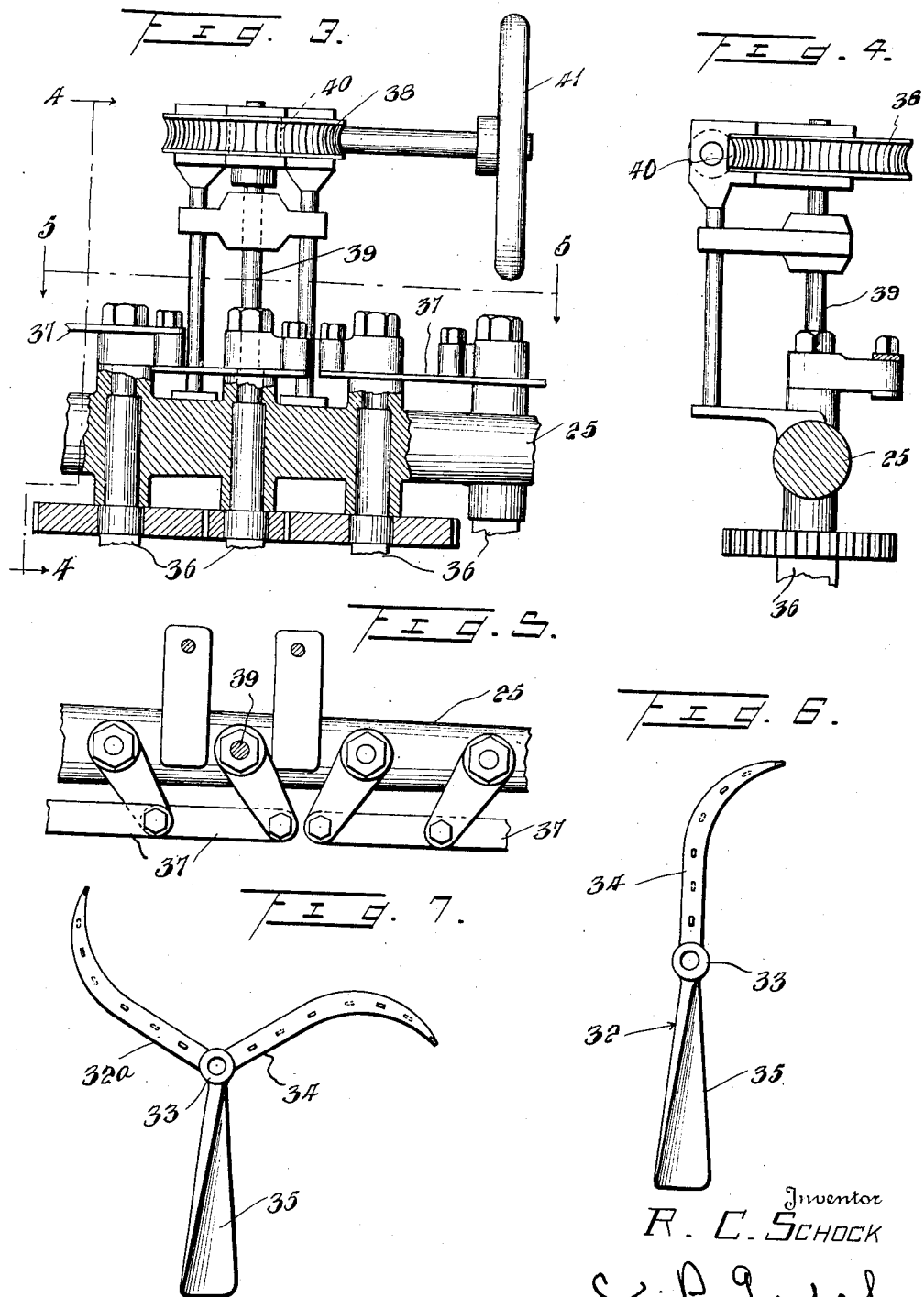

Patented Dec. 14, 1937

2,102,385

UNITED STATES PATENT OFFICE 2,102,385

BREWING DEVICE

Robert C. Schock, New Rochelle, N. Y., assignor to Shock, Gusmer & Co. Inc., Hoboken, N. J., a corporation of New Jersey Application April 20, 1936, Serial No. 75,333

5 Claims. (Cl. 259—102)

This invention relates to brewing devices, and more particularly to an improved mash and lauter or filter tub.

An object of this invention is to provide an improved mash and filter tub for mixing mash, the tub having means therein for stirring up the mash, and the stirring means being movable by hydraulic means into or out of the mash as may be desired.

Another object of the invention is the provision of a dual power means for the mash mixing devices and the higher speed is used for mixing. No thickening of the mash occurs during the mixing operation, merely a conversion of the starch into sugars. The slower speed is used for the lautering in order to obtain proper leeching and extracting.

A further object of this invention is to provide in a device of this character means for moving the mash outwardly from the center of the tub, the mash moving means being constructed in the form of blades which are provided with progressively varying pitches so that there will be an even flow of the mash from the center of the tub to the outer wall thereof.

Still another object of this invention is the provision of a mash cutting means in association with the cutting blades which is adapted to prevent undue packing of the mash where the cutting blades are rotated at a relatively slow speed.

A further object of this invention is to provide an improved mash cutting means which is so constructed that it will maintain an even density of the mash throughout the depth thereof.

With the foregoing and other objects in view, the invention will be more fully described hereinafter, and will be more particularly pointed out in the claims appended hereto.

In the drawings, wherein like symbols refer to like or corresponding parts throughout the several views:

Figure 3 is an enlarged fragmentary side elevation, partly in section, of the cutting blade adjusting means.

Figure 4 is a sectional view taken on the line 4—4 of Fig. 3.

Figure 5 is a section view taken on the line 5—5 of Fig. 3.

Figure 6 is an enlarged side elevation of one of the inner mixing blades.

Figure 7 is an enlarged side elevation of one of the outer mixing blades.

Figure 8 is a fragmentary front elevation of one of the cutting blades.

Figure 9 is a fragmentary side elevation of one of the cutting blades.

Figure 1:
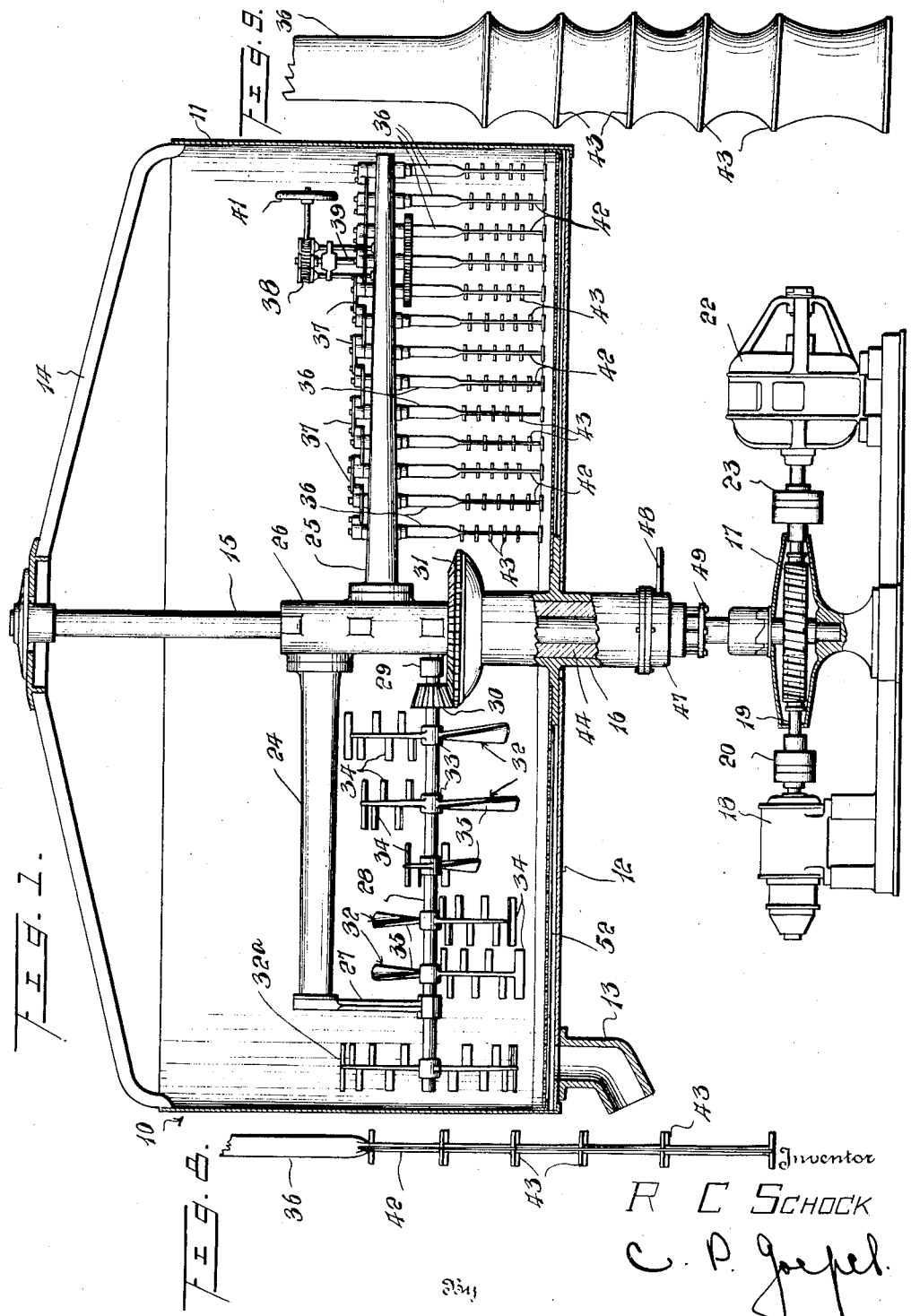
Figure 1 is a vertical section, partly in detail and partly broken away, of a mash mixing and filtering machine constructed according to an embodiment of this invention.
Figure 2:
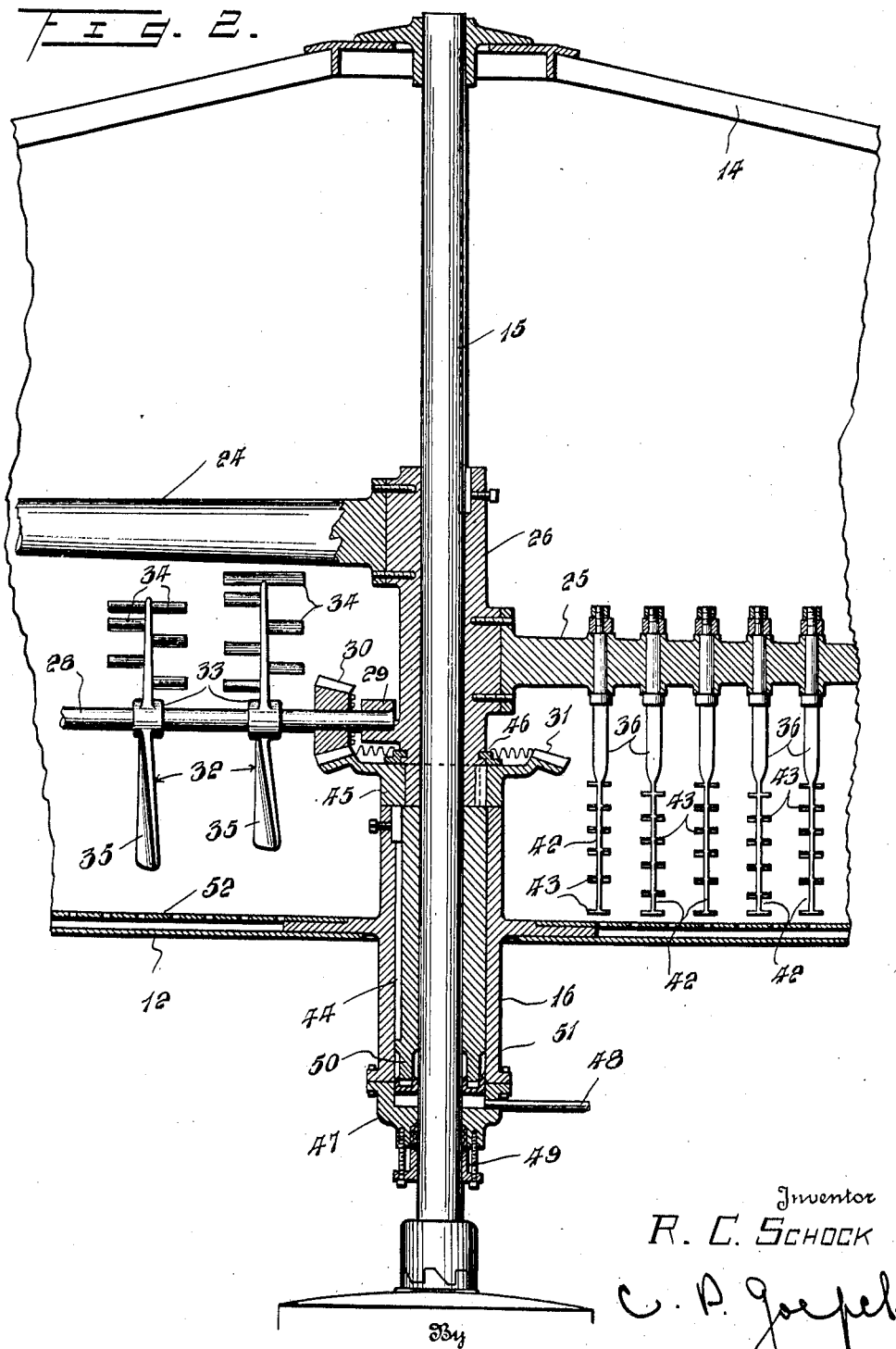
Figure 2 is an enlarged fragmentary vertical section of the device.

Referring to the drawings, the numeral 10 designates generally a tub or tank having a cylindrical side wall 11 and a relatively flat bottom wall 12. Outlets 13 are secured to the bottom wall 12 so that the spent grains may be removed from the tub 10 when desired. A top or cover 14 engages the upper portion of the tub. The tub 10 is stationary and may be supported on a suitable base or other supporting means (not shown). The wort syrup or juice filters through the false bottom 52, and in the bottom there are a series of eight to twenty one-inch diameter or larger openings connecting to a central collecting tank through which the wort flows. The cover 14 is provided with two hinged manholes at 90° to each other (not shown) to allow adjustment of lautering knives. The tub is filled through a circular opening (not shown) in the top 14 approximately eight inches in diameter.

A shaft 15 extends vertically and axially of the tub 10 and constitutes the driving shaft for the mixing and cutting devices hereinafter described. The drive shaft 15 extends downwardly through a bearing or bushing and has a worm gear 17 secured to the lower end thereof. A motor or power member 18 is coupled to a worm shaft 19 by means of an overrunning clutch 20 of conventional construction, and the worm secured to the shaft 19 meshes with the worm gear 17 so as to effect rotation of the drive shaft 15.

A second power member 22 is also coupled by means of an overrunning clutch 23 to the shaft 19, and this second power member 22 is preferably of higher power than the first power member 18 for mixing purposes and for removal of grains. The second power member 22 is operated, with the first power member 18 cut off. Motor 22 is the larger size motor and is used for mixing apparatus, and also for the removal of the grains which is accomplished by adjusting lauter knives 36 to the position shown in Fig. 9. Motor 22 is an adjustable speed motor having a shaft driving speed range of usually from 6 to 12 R. P. M., while motor 18 is either variable or constant speed motor and is designed to operate the cross arms at one revolution in three minutes. Mixing arms 34 are so designed that the bottom of these mixing arms are 3" higher than the bottom of the lautering knives 36. This is desirable because 3" of the filtering bed will thus not be disturbed by mixing apparatus 34.

A pair of horizontally disposed arms 24 and 25 are secured at their inner ends to a sleeve 26 which is slidable but not rotatable on the shaft 15. The outer end of the arm 24 has a depending shaft supporting bracket 27 secured thereto, and a mixing blade shaft 28 extends through this bracket 27. The inner end of the shaft 28 is rotatable in a bearing 29 carried by the sleeve 26, and a pinion 30 is secured to the shaft 28 adjacent the inner end thereof which meshes with a stationary ring gear 31.

The shaft 28 has a plurality of mixing members 32 secured thereto, and these mixing members 32 comprise a hub 33 secured to the shaft 28, a paddle member 34 secured to the hub 33, and a propeller blade 35 also secured to the hub 33. Preferably the outermost mixing member 32a is provided with several paddle members 34 and one or more blades 35, as shown in Fig. 7. This is an innovation, as it has not been customary in the past to use this triple blade. The blades 35 of the mixing device are progressively inclined from the inner end of the shaft 28 outwardly so as to effect an even flow of the mash outwardly toward the wall of the tub 10. The outer mixing member 32a maintains the mash adjacent the wall of the tub in a free and loosened condition and prevents the packing of the mash forced outwardly by the blades 35 so that the filtering may be uniform throughout the entire mass of the mash.

The arm 25 has a plurality of vertically disposed cutting members 36 mounted therein which are connected together by a linkage 37, and these cutting members 36 are adjusted by means of a worm gear 38 secured to a shaft 39. A worm 40 meshes with the gear 38 and is rotated by a hand wheel 41. Each blade 36 has a vertically disposed scalloped or fluted cutting portion 42 and a plurality of plows 43 which are preferably disposed on an inclination to the horizontal, as shown in Fig. 9, so that as these blade members 36 are swung around in the tub 10 the mash will be lifted by the plows 43. This is a very important point inasmuch as it tends to buoy up the mash during the revolving of the lautering knives, and keeps it from packing, thus allowing for more complete extraction and leeching. Plows 43 are also staggered in respect to each other in that the plows on the adjoining lauter blades are not on the same horizontal blades.

In order to provide a means whereby the arms 24 and 25 with the mixing and cutting blades may be lifted out of the mash when desired, I have provided a plunger 44 which is vertically slidable, but not rotatable in the bushing or cylinder 16. The upper end of the plunger 44 engages against the hub 45 of the ring gear 31, and a collar 46 is secured to the upper end of the hub 45 so as to hold the sleeve 26 against longitudinal movement relative to the hub 45 while permitting rotary movement of the sleeve 26 with the shaft 15.

The lower end of the cylinder 16 is provided with a head or cap 47 having a pressure line 48 connected thereto, and a gland 49 seals the cap 47 about the shaft 15. The lower end of the plunger 44 may be reduced as at 50 and a packing ring or member 51 secured to this reduced end. The tub 10 may also be provided with an inner or false bottom 52 which is preferably slotted or perforated, and which is supported in any suitable manner in upwardly spaced relation to the bottom 12.

In the use and operation of this mash mixing and filtering device, the desired mash and liquid is placed in the tub 10 and the motor 22 then operated to turn the shaft 15. Rotation of the shaft 15 will swing the arms 24 and 25, and as the arm 24 turns about in the tub 10 the pinion 30 will be rotated by means of the stationary gear 31. The pinion 30 will rotate the shaft 28 and likewise rotate the mixing members 32 so as to agitate the mash as well as move the mash outwardly from the center of the tub.

The arm 25 will swing about with the arm 24, and the cutting and stirring members 36 carried by the arm 25 will keep the mash at an even density throughout the depth thereof. Adjustment of the cutting and stirring members 36 may be made by means of the hand wheel 41 so that these members 36 may loosen up the mash to the desired degree.

The mash mixing and cutting means may be raised out of the mash while in motion by means of the plunger 44, it being only necessary to discharge the liquid under pressure in the lower portion of the cylinder 16 through the pipe 48.

After the mixing and cutting means have been working for a period of time and the mash becomes converted the motor is stopped, pressure is applied through pipe 48 and arms 24 and 25 elevated out of the mash. After a sufficient resting period motor 18 is placed in operation at a relatively slow speed and by means of a valve on pipe 48 arms 24 and 25 are gradually lowered into the mash cutting furrows in the mash to allow proper leeching to take place and at the same time hasten the rate of filtration. When the motor 22 is set in operation, the motor 18 is cut off. The overrunning clutches 20 and 23 will readily permit the operation of either of these motors either singly or together. After the mash has been converted, it is then proper to draw off the wort, and the lautering arms are adjusted in such a position that a furrow is cut into the filtering bed as the lautering knives are gradually lowered into the mash. This allows the sparge water to penetrate into the furrows and extract or leech the wort from the grains.

The use of the mash treating means hereinbefore described eliminates the use of a number of tubs for each separate treatment of the mash and provides an exceedingly compact structure which is easy to operate and which maybe readily cleaned.

It is obvious that various changes and modifications may be made in the details of construction and design of the above specifically described embodiment of this invention without departing from the spirit thereof, such changes and modifications being restricted only by the scope of the following claims.

What is claimed is:

1. A mash treating means comprising a tub, a plurality of mash mixing members in the tub, means for supporting said mixing members for swinging movement about the tub, means for rotating said mixing members coactive with the swinging movement thereof, a plurality of mash loosening members, means for supporting said loosening members for swinging movement with said mixing members, the innermost of said mixing members being so constructed as to move the mash outwardly of the center of the tub at a faster rate than the outermost mixing members, and means operable exteriorly of the tub for raising said mixing members and said loosening members out of the mash within the tub.

2. A mash treating means comprising a tub, a plurality of mixing and mash advancing members in the tub, means for supporting said members for swinging movement about the tub, the innermost of said members being constructed to advance the mash outwardly of the tub faster than the outermost of said members, a plurality of cutting and loosening knives in the tub, said knives having flat blades and plows secured transversely of the blades, means secured to said supporting means for holding said knives in vertical position above the bottom of said tub for swinging movement about the tub, the plows of adjacent knives being vertically offset to pass through the mash at different levels, and means for rotating the knives about the axes of the blades.

3. A mash treating means comprising a tub, a plurality of mixing members in the tub, means for supporting said members for swinging movement about the tub, a plurality of cutting and loosening knives in the tub, said knives having flat blades and plows secured transversely of the blades, an arm disposed horizontally in the tub and secured to said supporting means, said knives being journalled in said arm with the axes of the blades lying vertically of the tub, the plows of adjacent blades being vertically offset whereby to cut different horizontal planes in the mash, means interconnecting said knives for conjoint rotation in said arm, and manually operable means for rotating one of said knives whereby to present different faces of all of the knives to the mash.

4. A mash treating means comprising a tub, a plurality of mixing members in the tub, means for supporting said members for swinging movement about the tub, a plurality of cutting and loosening knives in the tub, said knives being of substantially equal length and having flat blades and plows secured transversely of the blades at an angle other than 90°, said plows of adjacent knives being offset lengthwise of the blades with respect to each other, means secured to said supporting means for holding said knives in vertical position above the bottom of the tub for swinging movement about the tub, and means on said holding means for rotating said blades about the axes of the blades.

5. A mash treating means comprising a tub, a vertically mounted rotatable hub within the tub, a plurality of mixing members, a frame secured to said hub for rotatably holding said mixing members, means for rotating said members about a horizontal axis upon rotation of said hub about a vertical axis, a plurality of cutting and loosening knives having flat blades and plows secured transversely of the blades, an arm secured to said hub and extending horizontally in the tub, said knives being journalled in the latter arm, connecting links between adjacent knives, and means operable to rotate one of said knives whereby to rotate the other knives through the links thereof.

ROBERT C. SCHOCK.